United States Patent
Horng et al.

(10) Patent No.: US 7,501,781 B2
(45) Date of Patent: Mar. 10, 2009

(54) PULSE-WIDTH-MODULATION MOTOR DRIVE CIRCUIT HAVING POTENTIAL LIMITER

(75) Inventors: Alex Horng, Kaohsiung (TW);
Chung-Ken Cheng, Kaohsiung (TW);
Cheng-Nan Tsai, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 172 days.

(21) Appl. No.: 11/643,668

(22) Filed: Dec. 22, 2006

(65) Prior Publication Data
US 2008/0101778 A1  May 1, 2008

(30) Foreign Application Priority Data
Oct. 25, 2006  (TW)  .............................. 95139371 A

(51) Int. Cl.
*G05B 11/28* (2006.01)
(52) U.S. Cl. .................... 318/599; 318/811; 318/782
(58) Field of Classification Search ................ 318/599, 318/811, 751, 772, 778, 782
See application file for complete search history.

(56) References Cited

U.S. PATENT DOCUMENTS

| | | | | |
|---|---|---|---|---|
| 5,847,523 | A * | 12/1998 | Rappenecker et al. ....... | 318/434 |
| 6,091,887 | A * | 7/2000 | Dieterle et al. .............. | 388/811 |
| 6,285,146 | B1 * | 9/2001 | Harlan ................... | 318/400.04 |
| 6,310,453 | B1 * | 10/2001 | Lin ............................ | 318/445 |
| 6,912,353 | B2 | 6/2005 | Nelson et al. | |
| 6,967,459 | B2 | 11/2005 | Hahn et al. | |
| 6,997,684 | B2 | 2/2006 | Hahn et al. | |
| 7,170,242 | B1 * | 1/2007 | Horng et al. ........... | 318/400.11 |
| 2003/0099561 | A1 * | 5/2003 | Heydt et al. .............. | 417/423.1 |

* cited by examiner

*Primary Examiner*—Rina I Duda
(74) *Attorney, Agent, or Firm*—Muncy, Geissler, Olds & Lowe PLLC

(57) ABSTRACT

A PWM motor drive circuit includes a drive IC member, a PWM converter circuit and a potential limiter. The drive IC member electrically connects with a motor coil and further includes a pin electrically connected with the PWM converter circuit. The potential limiter has a first terminal electrically connected with a point between the pin of the drive IC member and the PWM converter circuit, and a second terminal electrically connected with a power source to supply an initial voltage to the pin of the drive IC member via the potential limiter. When the motor starts, the potential limiter can adjust of the initial voltage supplying to the pin of the drive IC member so that the drive IC member cannot unexpectedly enter a stop or high-speed mode.

19 Claims, 11 Drawing Sheets

PULSE-WIDTH-MODULATION MOTOR DRIVE CIRCUIT HAVING POTENTIAL LIMITER

BACKGROUND OF THE INVENTION

1. Field of the Invention

The present invention relates to a PWM (Pulse Width Modulation) motor drive circuit having a potential limiter. More particularly, the present invention relates to the potential limiter of the PWM modulation motor drive circuit connected between a drive IC member and a PWM converter circuit so as to steadily increase the motor speed to a predetermined speed during starting the motor.

2. Description of the Related Art

Referring to FIG. 1, a conventional PWM motor includes a PWM motor drive circuit 1 electrically connected with a motor coil 2 so as to carry out alternatively magnetizing the motor coil 2. The alternatively magnetized motor coil 2 can drive a motor rotor (not shown) to turn with respect to a motor stator of the motor. Typically, the PWM motor drive circuit 1 includes a drive IC member 10, a Hall IC member 11 and a PWM converter circuit 12. The drive IC member 10 electrically connects with the Hall IC member 11 such that the drive IC member 10 may receive rotor-detecting signals supplied from the Hall IC member 11. However, the drive IC member 10 is designed to have a pin $V_{TH}$ which electrically connects with the PWM converter circuit 12. Correspondingly, the PWM converter circuit 12 has a PWM input pin 121 serving to introduce a PWM signal from an exterior system (not shown). The PWM signal is converted into a voltage signal by the PWM converter circuit 12, and then sent it to the pin $V_{TH}$ of the drive IC member 10 for controlling or adjusting a period of alternative magnetization of the motor coil 2. Accordingly, operational statuses of the motor are possessed of multi-speed modes in heat-dissipating operation by means of the PWM signal.

Generally, the motor divides the operational statuses into a high-speed mode (including full speed), a low-speed mode (excluding full or zero speed) and a stop mode (zero speed). The drive IC member 10 can determine the operational statuses of the motor according to the input PWM signal such that the motor can be adjusted and changed in speeds to fulfill various system needs. For example, when a voltage of the pin $V_{TH}$ of the drive IC member 10 is higher than 3.0 V, the drive IC member 10 controls the motor to operate at the stop mode as well as zero rpm. Conversely, when the voltage of the pin $V_{TH}$ of the drive IC member 10 is lower than a predetermined voltage (e.g. 2.0 V), the drive IC member 10 controls the motor to operate at the high-speed mode as well as 6,000 rpm. If the voltage of the pin $V_{TH}$ Of the drive IC member 10 is in the range of 2.0 V to 3.0 V, the drive IC member 10 controls the motor to operate at the low-speed mode as well as 2,000 rpm.

Referring again to FIG. 1, the PWM motor drive circuit 1 is designed to have a capacitor 9 parallel-connected between the drive IC member 10 and the PWM converter circuit 12. Meanwhile, the capacitor 9 is designed to have a ground connection in place. In operation, the capacitor 9 is adapted to commutate a current input from the PWM converter circuit 12. However, the capacitor 9 of the PWM motor drive circuit 1 is so configured to stabilize the voltage of the pin $V_{TH}$ of the drive IC member 10. When the motor is actuated, the voltage of the pin $V_{TH}$ of the drive IC member 10 can determine and adjust the speed of the motor.

Referring to FIGS. 2A and 2B, the drive IC member 10 can control the motor to operate in the high-speed mode or the low-speed mode. In normal operation, the speed of the motor is operating at 2,000 rpm as well as low-speed mode when the voltage of the pin $V_{TH}$ of the drive IC member 10 is maintained at 3.0 V (i.e. lesser than 3.6 V but greater than 2.0 V). But, in abnormal operation, the speed of the motor is operating at the high-speed mode when the voltage of the pin $V_{TH}$ of the drive IC member 10 drops to zero volts (i.e. lesser than 2.0 V).

Still referring to FIGS. 1, 2A and 2B, an initial voltage across the capacitor 9 automatically drops to zero volts due to a ground connection and its transient short circuit, as best shown in FIG. 2A, and a voltage from a power supply can charge the capacitor 9 when the motor starts. Inevitably, the initial voltage of the pin $V_{TH}$ of the drive IC member 10 is maintained at substantially zero volts. In this way, the drive IC member 10 can invariably control the motor to operate in the high-speed mode as long as the motor starts; namely, the speed of the motor is designated to rapidly and shortly jump to 6,000 rpm (i.e. full speed) from zero rpm, as best shown in FIG. 2B.

Referring back to FIGS. 1 and 2B, once started, the motor must inevitably enter the high-speed mode that must rapidly and shortly increase the speed of the motor. However, there is no greater amount of operational heat for dissipation. However, ambient heat generated from a heat source is lower than a high temperature when the motor starts. This results in the motor unnecessarily operating at full speed (i.e. top speed) which generates an increased amount of air noise and vibration. Furthermore, the motor occurs an increased amount of abrasion among motor components which may shorten the longevity of the motor.

Referring again to FIGS. 2A and 2B, the voltage across the capacitor 9 can reach 3.0 V in the event after charging for a predetermined time. In this way, the voltage of the pin $V_{TH}$ of the drive IC member 10 is greater than 2.0 V but lesser than 3.6 V so that the drive IC member 10 terminates the motor to operate in the high-speed mode. Accordingly, the speed of the motor is designated to drop to a predetermined speed or a lower speed of 2,000 rpm. Therefore, it is undesirable to permit the drive IC member 10 to increase the speed of the motor reaching 6,000 rpm in the high-speed mode when it starts.

Referring to FIG. 3, to solve the problem discussed above, there is provided a connection of a capacitor 9' in another PWM motor drive circuit 1 disclosed in applicant's own U.S. patent application Ser. No. 11/247,417, the entire disclosure of which is incorporated herein by reference. The capacitor 9' connects between a power source and the pin $V_{TH}$ of the drive IC member 10. The power source is selected from a pin $V_{6VREG}$ of the drive IC member 10 which can build a predetermined voltage (i.e. 6 V) on the pin $V_{TH}$ of the drive IC member 10 to determine the mode of the speed of the motor when it starts. Consequently, once the motor starts, the initial voltage of the pin $V_{TH}$ Of the drive IC member 10 cannot drop to zero volts.

Referring now to FIG. 4A, the capacitor 9' maintains the initial voltage of the pin $V_{TH}$ of the drive IC member 10 at 6.0 V due to electrically connection with the pin $V_{6VREG}$ of the drive IC member 10 and its transient short circuit when the motor starts. Subsequently, the voltage of the pin $V_{TH}$ of the drive IC member 10 can gradually drop to a voltage lower than 3.6 V and reach 3.0 V in the event after supplying the PWM signals to the motor for a predetermined time. Advantageously, the capacitor 9' can avoid dropping the initial voltage of the pin $V_{TH}$ of the drive IC member 10 to nearly zero volts.

Referring now to FIG. 4B, there exists a delay period of time when the voltage of the pin $V_{TH}$ of the drive IC member 10 drops from 6.0 V to 3.6 V. In this delay period of time, the drive IC member 10 can control the motor situated in the stop mode. Advantageously, the motor can avoid entering the high-speed mode when it starts. Subsequently, the motor can enter the low-speed mode as well as 2,000 rpm when the voltage of the pin $V_{TH}$ of the drive IC member 10 is lower than 3.6 V.

Although the capacitor 9' can be successful in eliminating the initial voltage of the pin $V_{TH}$ of the drive IC member 10 dropped to zero voltages, it can have some other disadvantages. The drive IC member 10 requires and controls the motor entering the stop mode and then changing to the low-speed mode. With regard to the problematic aspects forcibly entering the stop mode while starting the motor, the entire system is susceptible to causing a serious delay of time in control. In other words, it is undesirable to delay the operation of the motor or to completely stop the motor in the delay period of time. Hence, there is a need for improving the motor to prevent entering the stop mode while starting it.

To accomplish this task, the present invention intends to provide a PWM motor drive circuit having a potential limiter connected between a drive IC member and a PWM converter circuit. The potential limiter further electrically connects with a power source so that a voltage of a pin $V_{TH}$ of the drive IC member can be maintained at a predetermined voltage while starting the motor. Accordingly, the voltage changes of the pin $V_{TH}$ of the drive IC member can control the motor entering a low-speed mode and steadily increasing the speed while starting the motor in such a way as to mitigate and overcome the above problem.

SUMMARY OF THE INVENTION

The primary objective of this invention is to provide a PWM motor drive circuit having a potential limiter connected between a drive IC member and a PWM converter circuit. The capacitor further electrically connects with a power source to supply a voltage to a pin $V_{TH}$ of the drive IC member which can be maintained at a predetermined voltage while starting the motor. Accordingly, the PWM motor drive circuit is so configured to avoid delaying the operation of the motor while starting the motor, and to avoid generating vibration and air noise.

The secondary objective of this invention is to provide the PWM motor drive circuit which cannot unexpectedly enter a stop or high-speed mode while starting the motor. Accordingly, the PWM motor drive circuit is so configured to avoid the motor to unexpectedly enter the stop or high-speed mode at the same time while starting it.

The PWM motor drive circuit of the PWM motor in accordance with an aspect of the present invention includes a drive IC member, a PWM converter circuit and a potential limiter. The drive IC member electrically connects with a motor coil and further includes a pin electrically connected with the PWM converter circuit. The potential limiter has a first terminal electrically connected with a point between the pin of the drive IC member and the PWM converter circuit, and a second terminal electrically connected with a power source to supply an initial voltage to the pin of the drive IC member via the potential limiter. When the motor starts, the potential limiter can adjust of the initial voltage supplying to the pin of the drive IC member so that the drive IC member cannot unexpectedly enter a stop or high-speed mode.

In a separate aspect of the present invention, the potential limiter is selected from a combination of a zener diode and a capacitor unit.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
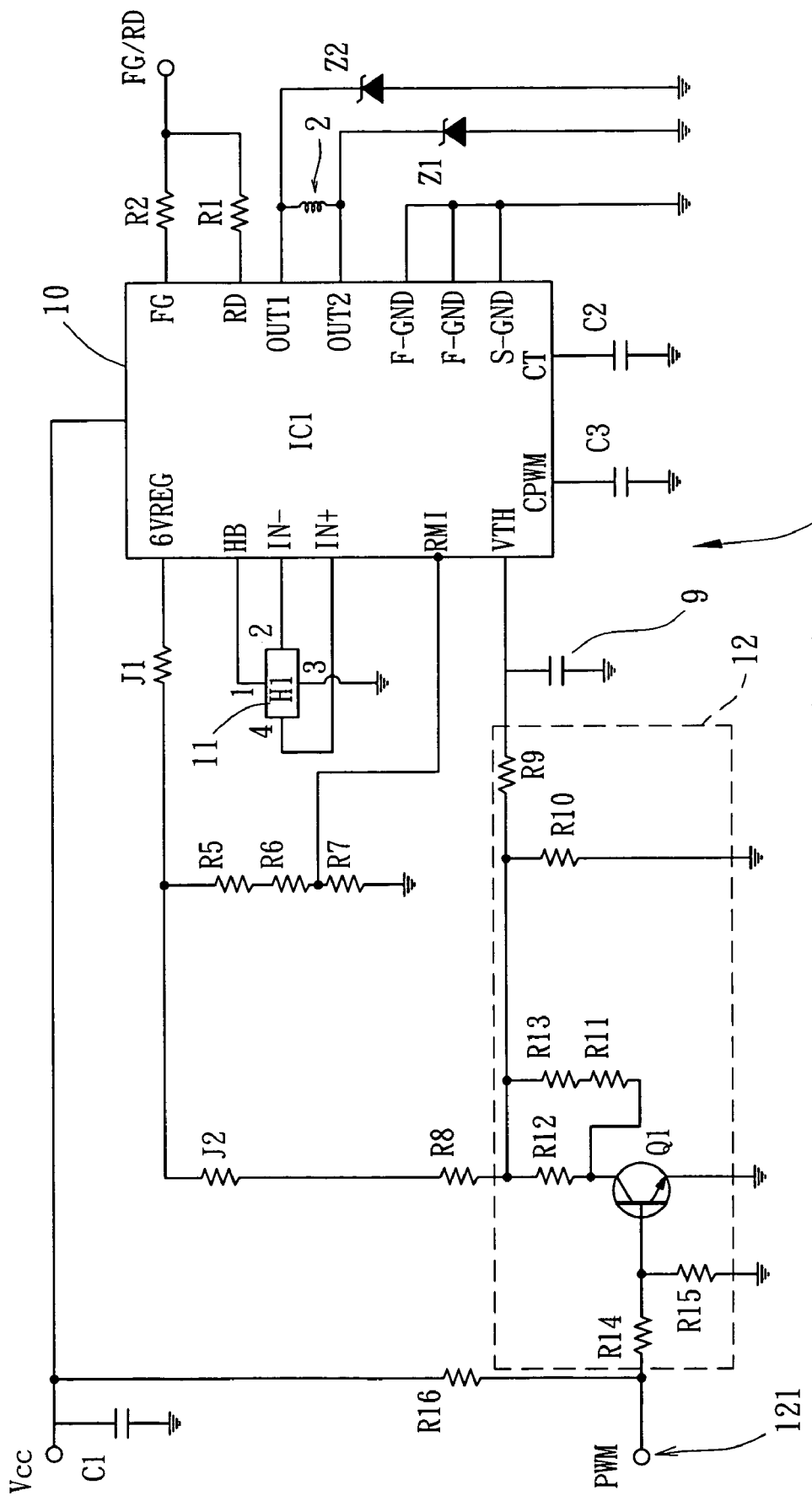
FIG. 1 is a schematic circuitry diagram of a conventional PWM motor drive circuit in accordance with the prior art.
Figure 5:
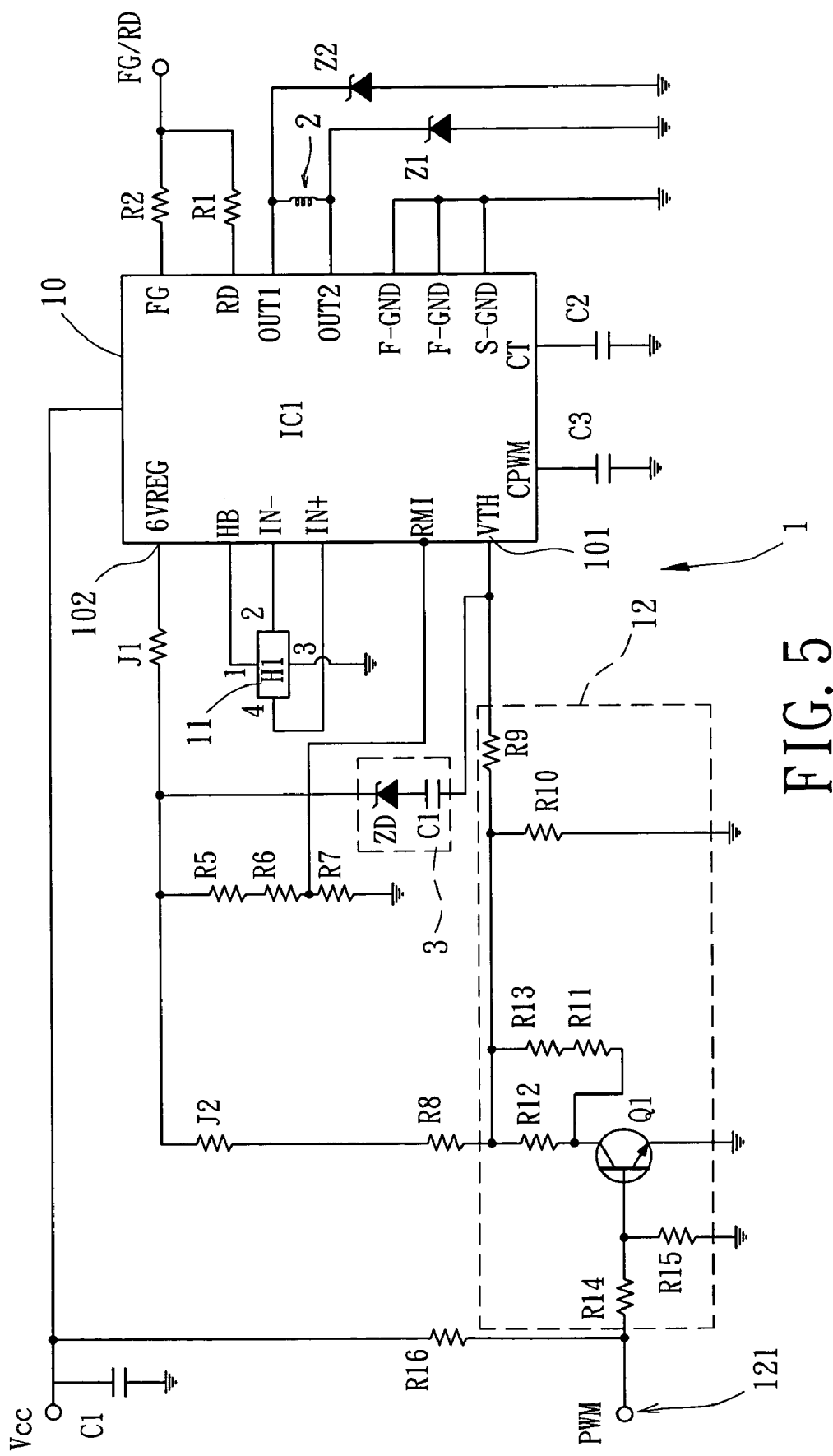
FIG. 5 is a schematic circuitry diagram of a PWM motor drive circuit in accordance with a first embodiment of the present invention.

Turning now to FIG. 5, a schematic circuitry diagram of a PWM motor drive circuit in accordance with a first embodiment of the present invention is shown. It should be understood that reference numerals of the PWM motor drive circuit of the preferred embodiment of the present invention have applied the identical numerals of the conventional PWM motor drive circuit, as shown in FIG. 1.

Still referring to FIG. 5, a PWM motor drive circuit 1 electrically connects with a motor coil 2 so as to carry out alternatively magnetizing the motor coil 2. In a preferred embodiment, the motor coil 2 can be selected from a group consisting of a single-phase coil, a double-phase coil and a three-phase coil. Typically, the PWM motor drive circuit 1 includes a drive IC member 10, a Hall IC member 11, a PWM converter circuit 12 and a potential limiter 3. In operation, the PWM motor drive circuit 1 is adapted to control the motor coil 2 so that the motor coil 2 can generate an alternatively magnetic field.

Still referring to FIG. 5, the drive IC member 10 electrically connects with the Hall IC member 11, and further electrically connects with the PWM converter circuit 12. The drive IC member 10 includes a first pin (identified as $V_{TH}$) 101 and a second pin 102 (identified as 6VREG). The first pin $V_{TH}$ 101 is adapted to electrically connect with the PWM converter circuit 12 for introducing PWM signals while the second pin 102 is adapted to supply a predetermined voltage to the PWM converter circuit 12 and the potential limiter 3. In a preferred embodiment, the second pin 102 of the drive IC member 10 supplies 6.0 V to the PWM converter circuit 12 and the potential limiter 3.

With continued reference to FIG. 5, the potential limiter 3 has a first terminal electrically connected with a point between the first pin 101 of the drive IC member 10 and the PWM converter circuit 12, and a second terminal electrically connected with the second pin 102 of the drive IC member 10 (i.e. power source) to supply an initial voltage to the first pin 101 of the drive IC member 10 via the potential limiter 3. In an alternative embodiment, the power source may be selected from an exterior power source. The potential limiter 3 can build an initial voltage on the first pin 101 of the drive IC member 10 while starting the motor.

With continued reference to FIG. 5, the potential limiter 3 is selected from a combination of a zener diode (identified as ZR) and a first capacitor unit (identified as C1). In the first embodiment, the zener diode ZR and the first capacitor unit C1 are serially connected. The zener diode ZR has an end electrically connected with the second pin 102 of the drive IC member 10 or the exterior power source. The zener diode ZR naturally has a characteristic of breakdown voltage (e.g. 2.4 V) which can build a predetermined voltage drop across the potential limiter 3 such that the voltage of the first pin 101 of the drive IC member 10 built by the second pin 102 can be adjusted. The first capacitor unit C1 electrically connects with the point between the first pin 101 of the drive IC member 10 and the PWM converter circuit 12.

Figure 6A:
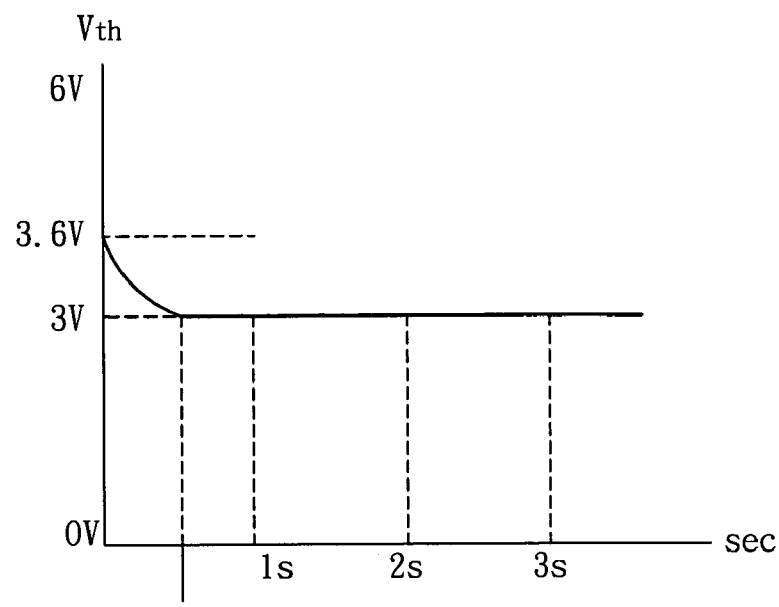
FIG. 6A is a timing diagram relating to the voltage at a selected pin of a drive IC member of the PWM motor drive circuit in FIG. 5 in accordance with the first embodiment of the present invention.
Figure 6B:
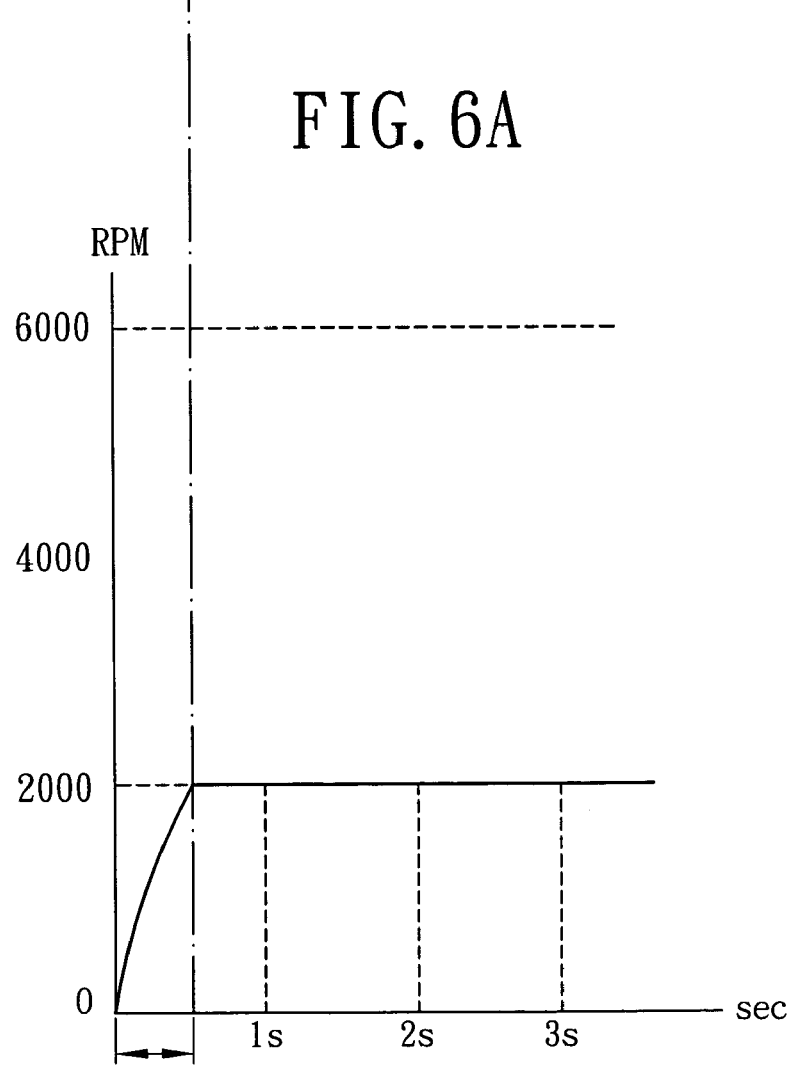
FIG. 6B is a timing diagram relating to the speed of the PWM motor in accordance with the first embodiment of the present invention.

Turning now to FIGS. 6A and 6B, a timing diagram relating to the voltage at the first pin $V_{TH}$ 101 of the drive IC member 10 of the PWM motor drive circuit in FIG. 5, and a timing diagram relating to the speed of the PWM motor in accordance with the first embodiment of the present invention are shown.

Referring again to FIGS. 5, 6A and 6B, when the PWM motor starts, the first pin 101 of the drive IC member 10 connected with the potential limiter 3 and the second pin 102 supplies a predetermined voltage to the potential limiter 3, 6.0 V for example. The zener diode ZR drops 2.4 V across the potential limiter 3 which is supplied 6.0 V from the second pin 102 of the drive IC member 10. Once started, the potential limiter 3 can only build an initial voltage of 3.6 V to the first pin 101 of the drive IC member 10 via the first capacitor unit C1.

Referring again to FIGS. 5 and 6A, the zener diode ZR of the potential limiter 3 maintains the initial voltage of the first pin 101 of the drive IC member 10 at 3.6 V due to electrically connection with the second pin 102 of the drive IC member 10 and a transient short circuit of the first capacitor unit C1 when the motor starts. Subsequently, the voltage of the first pin 101 of the drive IC member 10 can gradually drop to 3.0 V in the event after supplying the PWM signals to the motor for a predetermined time. This results in a buffer period of time in starting the motor. Advantageously, the potential limiter 3 can avoid dropping the initial voltage of the first pin 101 of the drive IC member 10 to nearly zero volts or it jumping higher than 3.6 V. Consequently, the drive IC member 10 can control the PWM motor to have a buffer period for increasing speed so as to smoothly speed the PWM motor to the predetermined speed and to maintain the speed of the PWM motor in the low-speed mode. In the first embodiment, the drive IC member 10 controls the speed of the motor to start at 0 rpm and to gradually increase to 2,000 rpm during the buffer period of time. The drive IC member 10 can also avoid stopping the motor while starting it, as best shown in FIG. 6B.

Referring again to FIG. 5, the capacitance of the first capacitor unit C1 can be adjusted according to the design choice so that the buffer period for the PWM motor drive circuit 1 can be adjusted. Advantageously, the speed of the PWM motor must be paced within the buffer period determined by the PWM motor drive circuit 1 to reach a predetermined speed. Consequently, an improper delay or speeding of the PWM motor can be eliminated while starting it.

With continued reference to FIG. 5, the Hall IC member 11 is adapted to detect a signal of a motor rotor and to send it to the drive IC member 10. Accordingly, the drive IC member 10 can determine switching on or off the motor coil 2 such that the alternatively magnetic field of the motor coil 2 can drive the motor rotor to turn.

With continued reference to FIG. 5, the PWM converter circuit 12 has a PWM input terminal 121 connected with a PWM source so as to receive PWM signals. In operation, the PWM converter circuit 12 is adapted to convert the PWM signals into voltage signals and to send them to the first pin 101 of the drive IC member 10 such that the drive IC member 10 can determine a cycle for switching the alternatively magnetic field of the motor coil 2. Consequently, the speed of the PWM motor is controlled.

With continued reference to FIG. 5, the capacitance of the first capacitor unit C1 can be adjusted according to the design choice so that the buffer period for the PWM motor drive circuit 1 can be adjusted. Advantageously, the speed of the PWM motor must be paced within the buffer period determined by the PWM motor drive circuit 1 to reach a predetermined speed. Consequently, an improper delay or speeding of the PWM motor can be eliminated while starting it.

Figure 7:
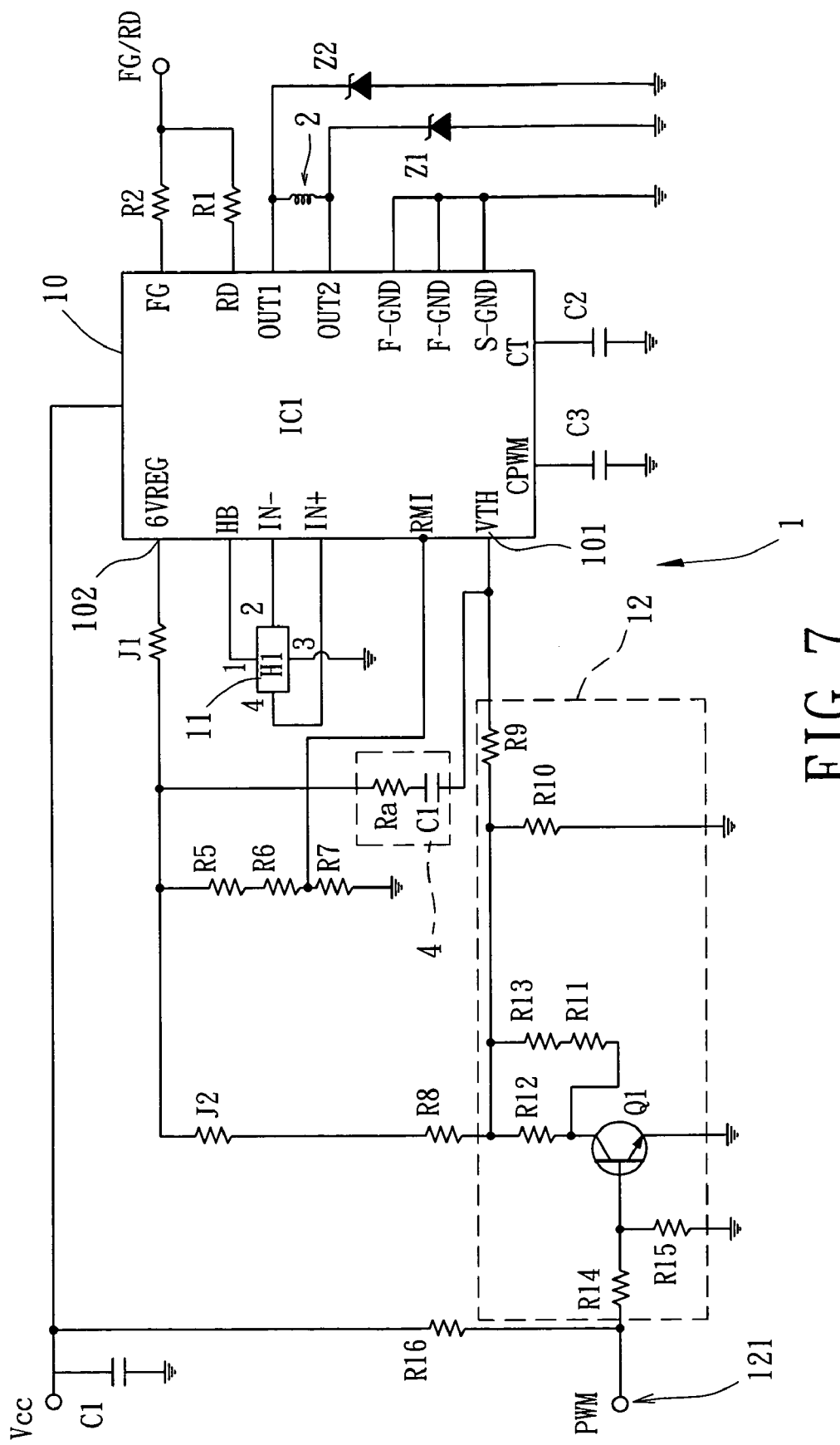
FIG. 7 is a schematic circuitry diagram of a PWM motor drive circuit in accordance with a second embodiment of the present invention.

Turning now to FIG. 7, a schematic circuitry diagram of the PWM motor drive circuit in accordance with a second embodiment of the present invention is shown. In comparison with the first embodiment, the potential limiter 4 of the second embodiment is selected from a combination of a passive resistor member (identified as Ra) and a first capacitor unit (identified as C1). The passive resistor member Ra and the first capacitor unit C1 are serially connected. The passive resistor member Ra has an end electrically connected with the second pin 102 of the drive IC member 10 or the exterior power source. The combination of the passive resistor member Ra and resistor members (identified as R9, R10, R11, R12, R13) is in the form of circuit which can build a predetermined voltage drop across the potential limiter 4 such that the initial voltage of the first pin 101 of the drive IC member 10 built by the second pin 102 can be adjusted. Advantageously, the resistance of the passive resistor member Ra can also be adjusted according to the design choice so that the buffer period for the PWM motor drive circuit 1 can be adjusted.

Figure 8:
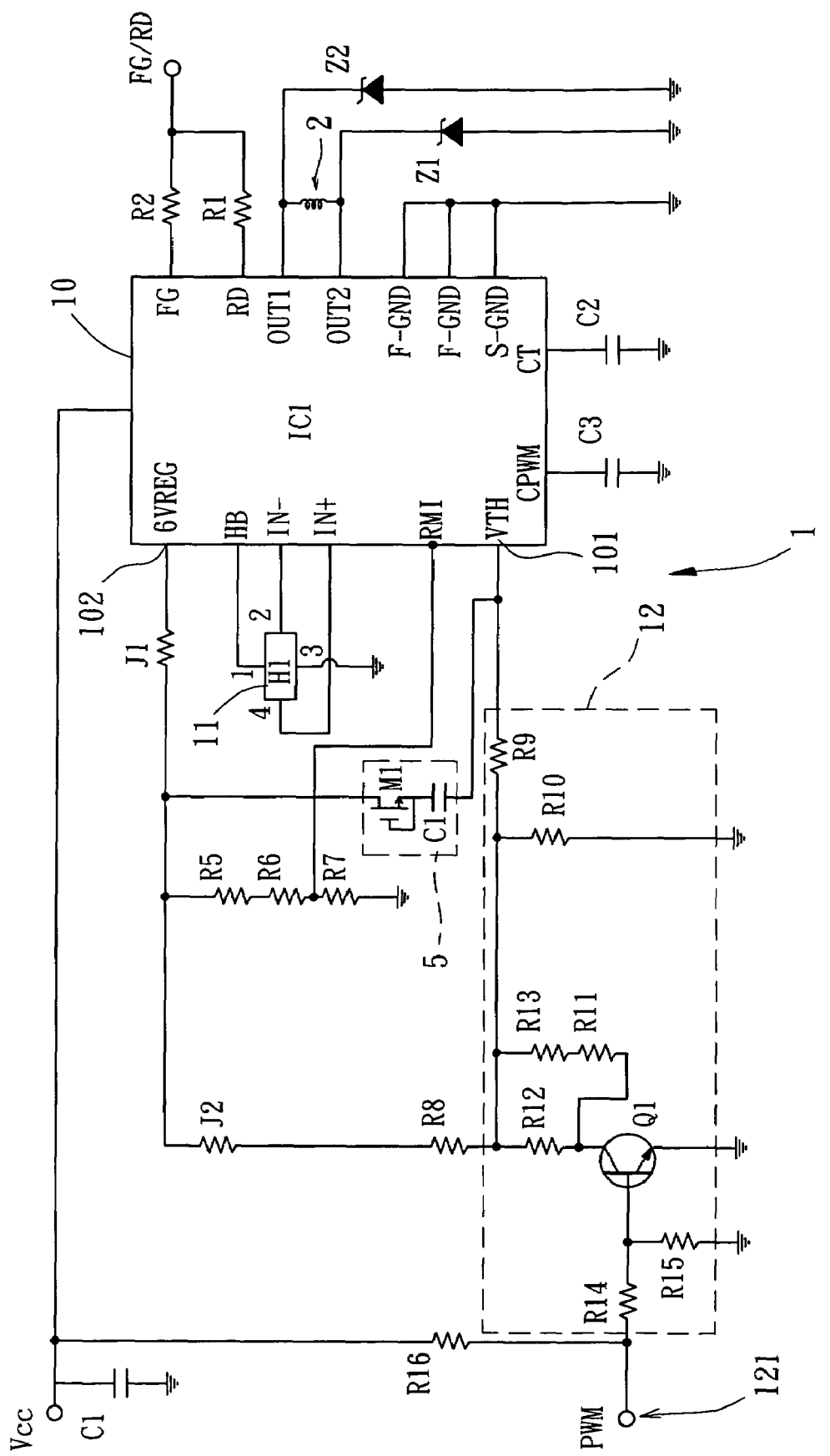
FIG. 8 is a schematic circuitry diagram of a PWM motor drive circuit in accordance with a third embodiment of the present invention.

Turning now to FIG. 8, a schematic circuitry diagram of the PWM motor drive circuit in accordance with a third embodiment of the present invention is shown. In comparison with the first and second embodiments, the potential limiter 5 of the third embodiment is selected from a combination of an active load (identified as M1) and a first capacitor unit (identified as C1). The active load M1 and the first capacitor unit C1 are serially connected. The active load M1 is preferably selected from a transistor member. The active load M1 has an end electrically connected with the second pin 102 of the drive IC member 10 or the exterior power source which supplies a relatively low voltage level. In a preferred embodiment, the active load M1 is preferably selected from a N-type metal-oxide-semiconductor field effect transistor (NMOS-FET) having a gate and a source connected together with the first capacitor unit C1. The combination of the active load M1 and the resistor members R9-R10 is in the form of circuit which can build the initial voltage of the first pin 101 of the drive IC member 10 built by the second pin 102 while starting the motor.

Figure 9:
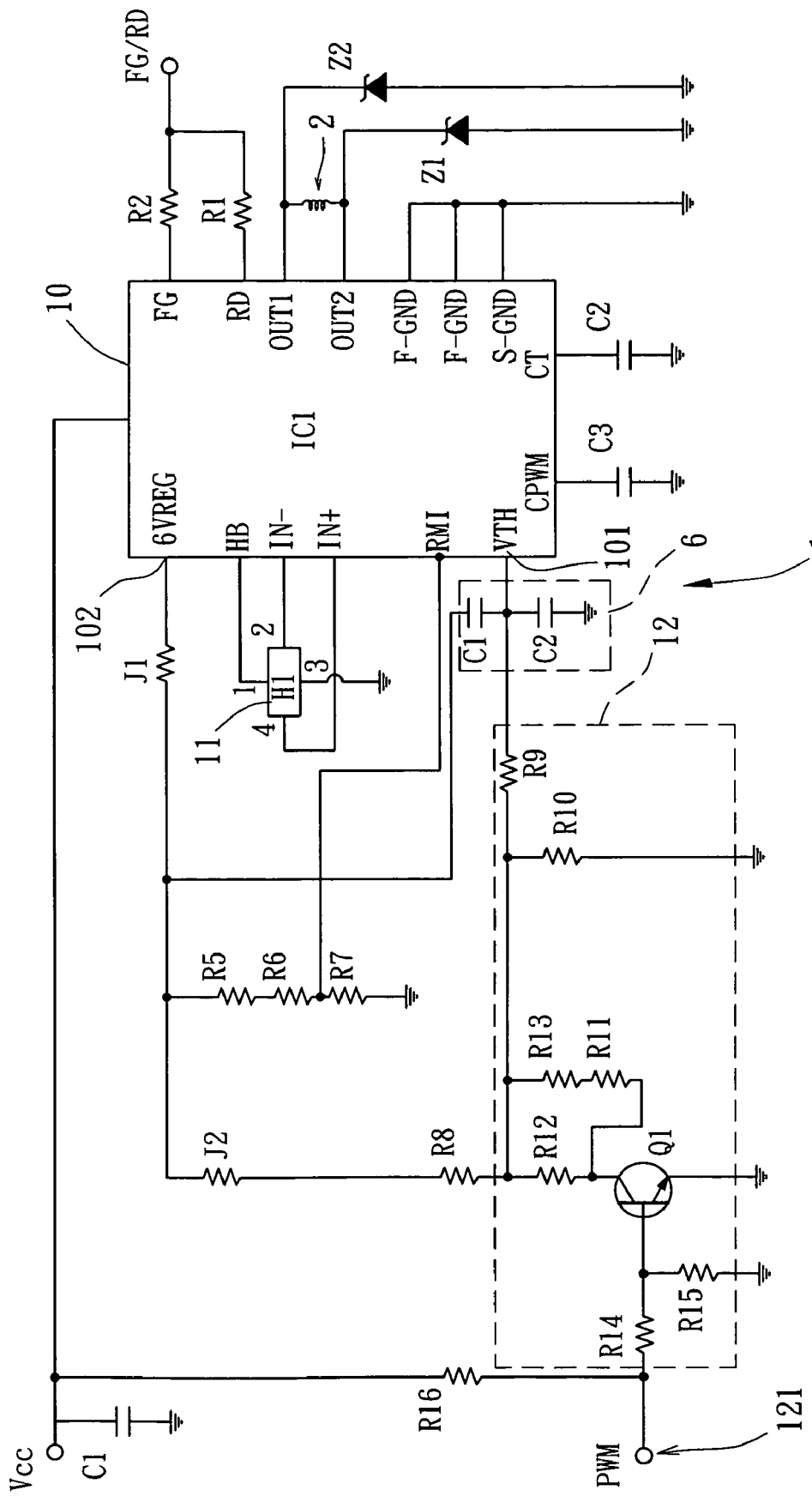
FIG. 9 is a schematic circuitry diagram of a PWM motor drive circuit in accordance with a fourth embodiment of the present invention.

Turning now to FIG. 9, a schematic circuitry diagram of the PWM motor drive circuit in accordance with a fourth embodiment of the present invention is shown. In comparison with the first through third embodiments, the potential limiter 6 of the fourth embodiment is selected from a combination of a first capacitor unit (identified as C1) and a second capacitor unit (identified as C2). The first capacitor unit C1 and the second capacitor unit C2 are serially connected. The first capacitor unit C1 is electrically connected between the first pin 101 and the second pin 102 of the drive IC member 10, or between the first pin 101 and the exterior power source. The first capacitor unit C1 and the second capacitor unit C2 are connected together with the first pin 101 of the drive IC member 10. Furthermore, the potential limiter 6 also has a ground connection via the second capacitor unit C2. The combination of the first capacitor unit C1 and the second capacitor unit C2 can adjust the initial voltage of the first pin 101 of the drive IC member 10 built by the second pin 102 while starting the motor.

Still referring to FIG. 9, in a preferred embodiment, the capacitance of the first capacitor unit C1 and the second capacitor unit C2 can be adjusted by series-parallel connection according to the design choice so that the buffer period for the PWM motor drive circuit 1 can be adjusted. Preferably, each capacitance of the first capacitor unit C1 and the second capacitor unit C2 is selected from a series of capacitors having fixed capacitances or variable capacitances.

Figure 10:
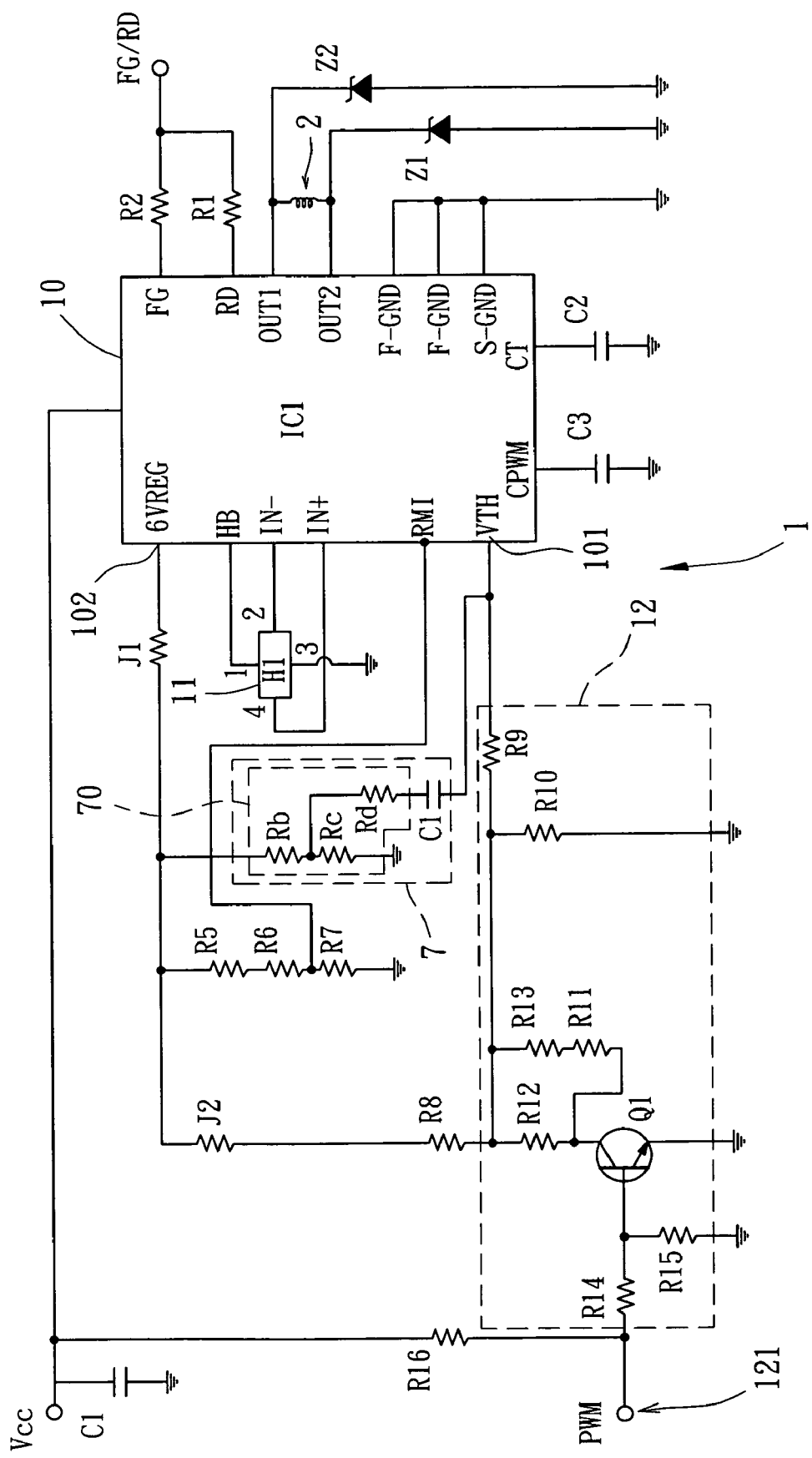
FIG. 10 is a schematic circuitry diagram of a PWM motor drive circuit in accordance with a fifth embodiment of the present invention.

Turning now to FIG. 10, a schematic circuitry diagram of the PWM motor drive circuit in accordance with a fifth embodiment of the present invention is shown. In comparison with the first through fourth embodiments, the potential limiter 7 of the fifth embodiment is selected from a combination of a passive voltage divider network 70 and a first capacitor unit (identified as C1). The passive voltage divider network 70 and the first capacitor unit C1 are serially connected. The passive voltage divider network 70 is constructed from a plurality of passive loads, such as resistors or capacitors. In the fifth embodiment, the resistors Rb, Rc, Rd are electrically connected and can be selected from variable resistors. The resistor members R9, R10, R11, R12, R13 provided in the PWM motor drive circuit 1 may not affect the passive voltage divider network 70. The passive voltage divider network 70 can adjust the initial voltage of the first pin 101 of the drive IC member 10 built by the second pin 102 while starting the motor.

Figure 11:
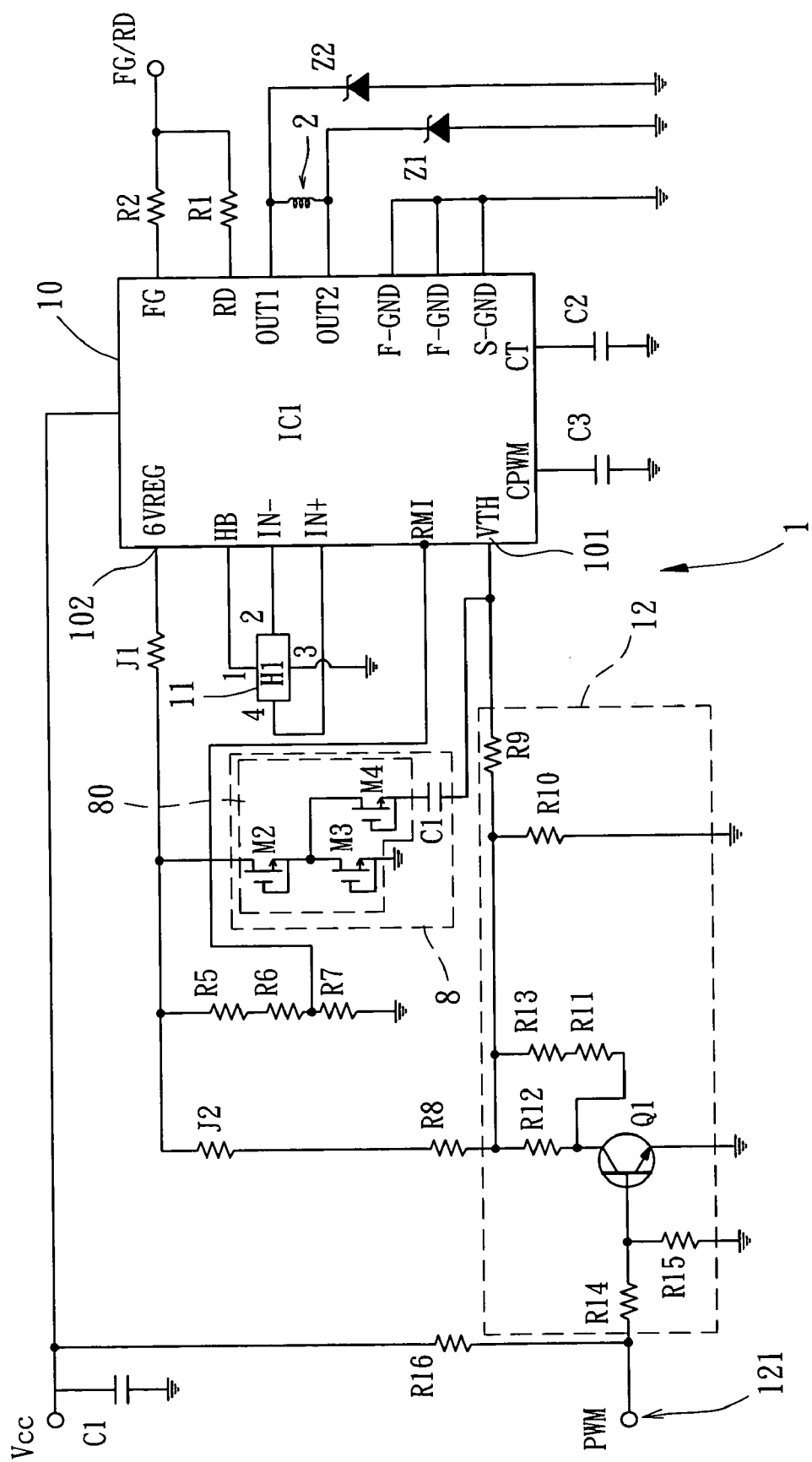
FIG. 11 is a schematic circuitry diagram of a PWM motor drive circuit in accordance with a sixth embodiment of the present invention.

Turning now to FIG. 11, a schematic circuitry diagram of the PWM motor drive circuit in accordance with a sixth embodiment of the present invention is shown. In comparison with the first through fifth embodiments, the potential limiter 8 of the sixth embodiment is selected from a combination of an active voltage divider network 80 and a first capacitor unit (identified as C1). The active voltage divider network 80 and the first capacitor unit C1 are serially connected. The active voltage divider network 80 is constructed from a plurality of active loads, such as transistors. In the fifth embodiment, the transistors M2, M3, M4 are electrically connected. The active voltage divider network 70 has an output connected with a buffer, such as an amplifier or CMOS circuit.

Figure 2A:
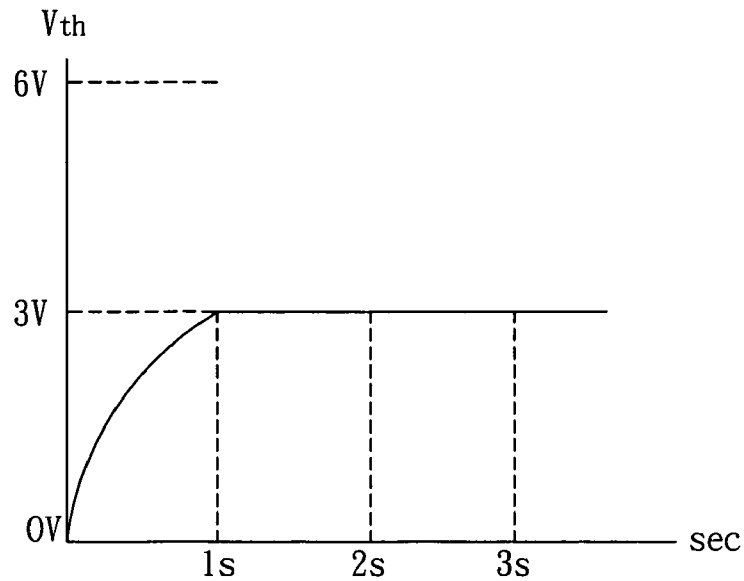
FIG. 2A is a timing diagram relating to the voltage at a selected pin of a drive IC member of the conventional PWM motor drive circuit in FIG. 1 in accordance with the prior art.
Figure 2B:
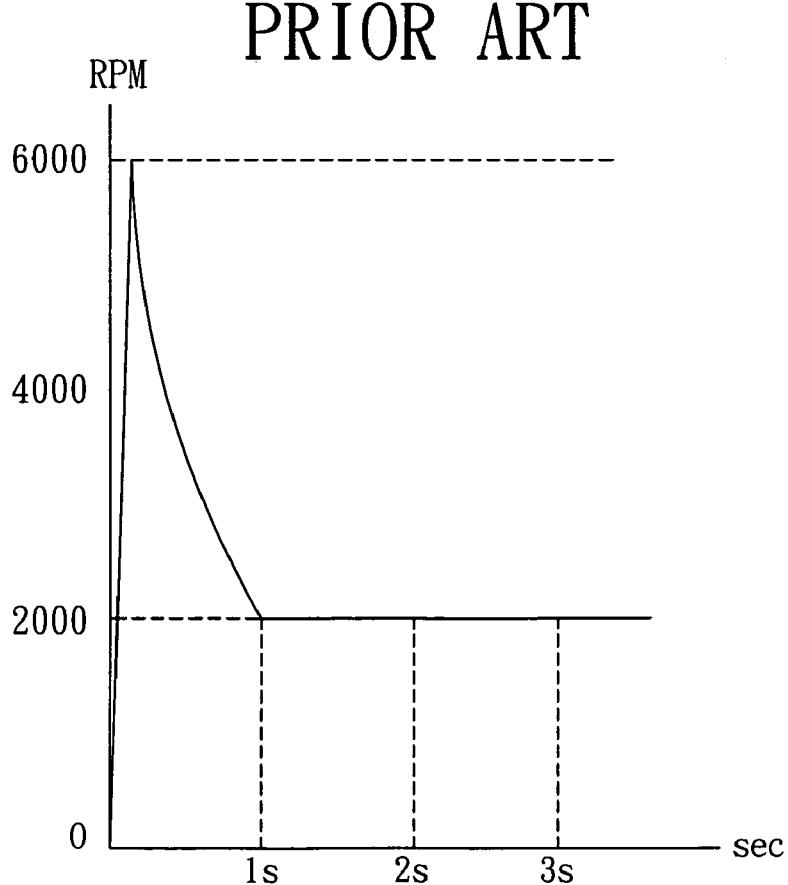
FIG. 2B is a timing diagram relating to the speed of the conventional PWM motor in accordance with the prior art.
Figure 3:
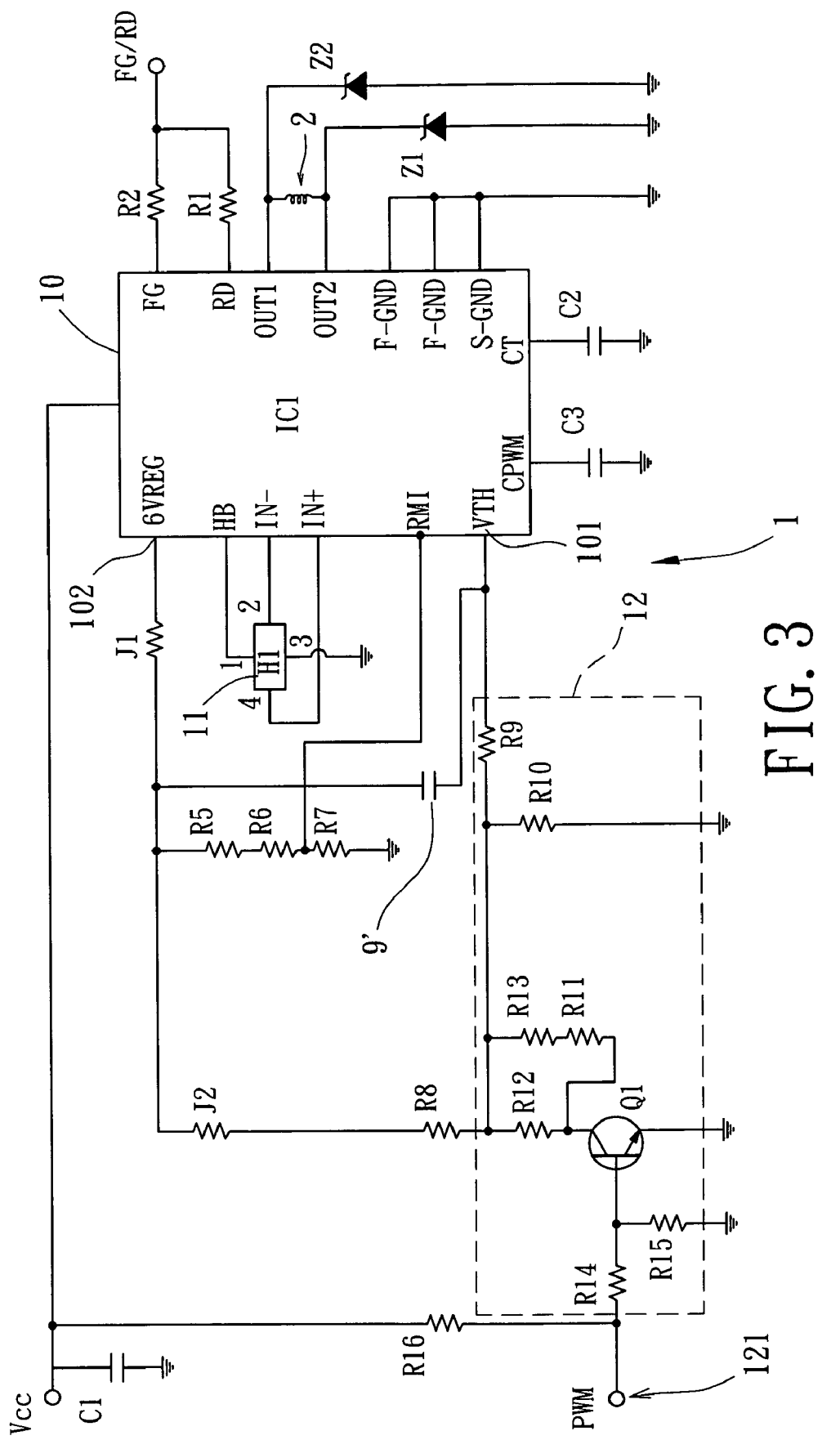
FIG. 3 is a schematic circuitry diagram of another PWM motor drive circuit in accordance with the prior art.
Figure 4A:
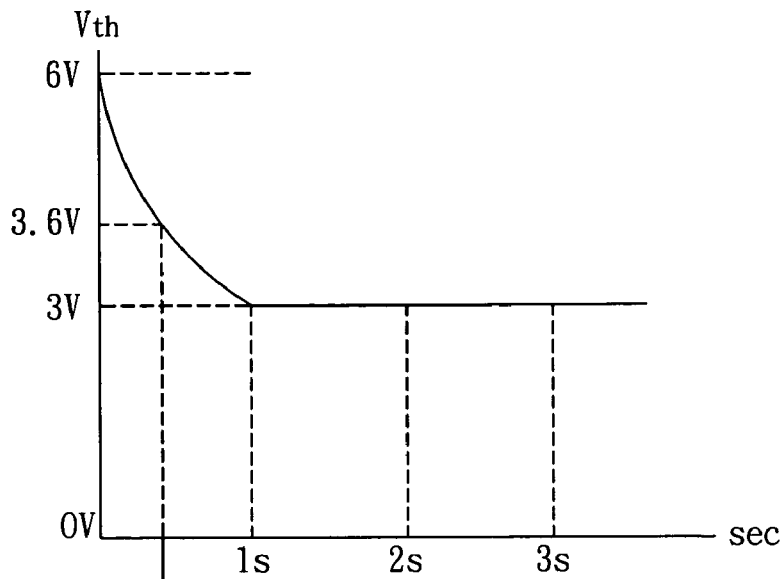
FIG. 4A is a timing diagram relating to the voltage at a selected pin of a drive IC member of the PWM motor drive circuit in FIG. 3 in accordance with the prior art.
Figure 4B:
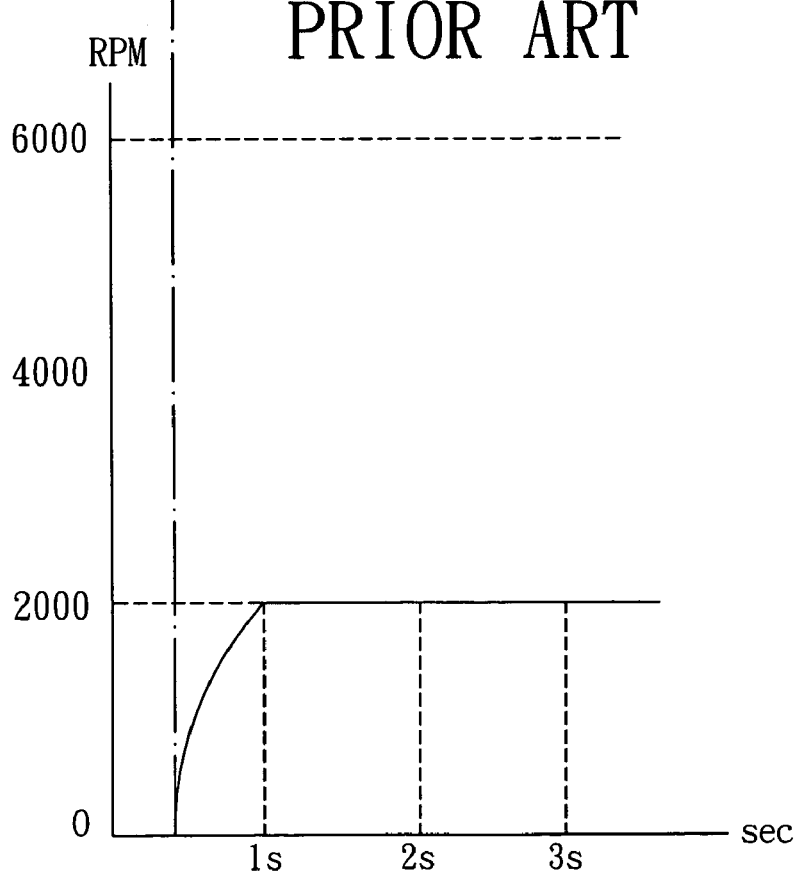
FIG. 4B is a timing diagram relating to the speed of the PWM motor in accordance with the prior art.

As has been discussed above, referring back to FIG. 1, the conventional PWM motor drive circuit 1 includes the capacitor 9 connected in parallel between the drive IC member 10 and the PWM converter circuit 12, and the capacitor 3 is further designed to have the ground connection. Disadvantageously, when the conventional PWM motor starts, the initial voltage of the capacitor 3 is zero such that the PWM motor is operated in the high-speed mode, and rapidly jumped to the speed of 6,000 rpm, as shown in FIG. 2B. Referring back to FIG. 3, another conventional PWM motor drive circuit 1 includes the capacitor 9' connected between the first pin 101 and the second pin 102 of the drive IC member 10 so that the initial voltage of the first pin 101 of the drive IC member 10 built by the second pin 102 can jump to 6.0 V. Disadvantageously, there exists an unwanted delay period of time for the motor while starting it, as best shown in FIG. 6B.

As best shown in FIG. 5, the potential limiter 3 of the present invention can adjust of the initial voltage supplying to the first pin 101 of the drive IC member 10 so that the drive IC member 10 cannot unexpectedly enter a stop or high-speed mode when the motor starts. Advantageously, the drive IC member 10 can avoid an improper delay or speeding of the PWM motor while starting the motor.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A PWM motor drive circuit, comprising:
   a drive IC member electrically connected with a motor coil, the drive IC member being capable of controlling a speed of a motor by means of a PWM signal;
   a PWM converter circuit electrically connected with the drive IC member for inputting the PWM signal; and
   a potential limiter having a first terminal electrically connected with a point between a first pin of the drive IC member and the PWM converter circuit, a second terminal connected with a power source, and a capacitor unit serially connected between the first and second terminals;
   wherein when the motor starts, said potential limiter builds a predetermined initial voltage on the first pin of the drive IC member by charging the capacitor unit of the potential limiter with the power source in a buffer period, said potential limiter controls the drive IC member to gradually speed up the speed of the motor from zero to a predetermined speed in the buffer period without delay of time.

2. The PWM motor drive circuit as defined in claim 1, wherein the drive IC member has a first pin and a second pin; said potential limiter connecting between the first pin and the second pin of the drive IC member.

3. The PWM motor drive circuit as defined in claim 1, wherein said potential limiter is selected from a combination of a zener diode and the capacitor unit.

4. The PWM motor drive circuit as defined in claim 1, wherein said potential limiter is selected from a combination of a passive resistor member and the capacitor unit.

5. The PWM motor drive circuit as defined in claim 1, wherein said potential limiter is selected from a combination of an active load and the capacitor unit.

6. The PWM motor drive circuit as defined in claim 5, wherein the active load is selected from a transistor, and the active load is operated in the active region.

7. The PWM motor drive circuit as defined in claim 1, wherein the capacitor unit of said potential limiter is constructed from a series of capacitors connected in serial or parallel.

8. The PWM motor drive circuit as defined in claim 1, wherein said potential limiter includes another capacitor unit; and wherein one of the two capacitor unitsis electrically connected with the power source andthe other one of the two capacitor units is electrically connected to the ground, while the two capacitor units are electrically connected with the first pin of the drive IC member jointly.

9. The PWM motor drive circuit as defined in claim 8, wherein each of the two capacitor units is selected from a series of capacitors, each having a fixed capacitance or a variable capacitance.

10. The PWM motor drive circuit as defined in claim 1, wherein said potential limiter is selected from a combination of a passive voltage divider network and the capacitor unit.

11. The PWM motor drive circuit as defined in claim 10, wherein the passive voltage divider network is constructed from a plurality of passive loads.

12. The PWM motor drive circuit as defined in claim 11, wherein each of the passive loads is selected from a resistor or a capacitor.

13. The PWM motor drive circuit as defined in claim 1, wherein said potential limiter is selected from a combination of an active voltage divider network and the capacitor unit.

14. The PWM motor drive circuit as defined in claim 13, wherein the active voltage divider network is constructed from a plurality of transistors connected each other.

15. The PWM motor drive circuit as defined in claim 3, wherein the zener diode is serially connected between the capacitor unit and the second terminal.

16. PWM motor drive circuit as defined in claim 4, wherein the passive resistor member is serially connected between the capacitor unit and the second terminal.

17. The PWM motor drive circuit as defined in claim 5, wherein the active load is serially connected between the capacitor unit and the second terminal.

18. The PWM motor drive circuit as defined in claim 10, wherein the passive voltage divider network is serially connected between the capacitor unit and the second terminal.

19. The PWM motor drive circuit as defined in claim 10, wherein the active voltage divider network is serially connected between the capacitor unit and the second terminal.

* * * * *